United States Patent [19]
Pfoertner

[11] 3,770,039
[45] Nov. 6, 1973

[54] ELASTOMERIC TRACTION DEVICE
[76] Inventor: Rolf Pfoertner, 2176 E. 28th Ave., Vancouver, B. C., Canada
[22] Filed: Sept. 1, 1971
[21] Appl. No.: 177,004

[30] Foreign Application Priority Data
July 20, 1971 Canada .............................. 118591

[52] U.S. Cl. ............................................... 152/221
[51] Int. Cl. ............................................. B60c 27/00
[58] Field of Search ................... 152/221, 222, 225, 152/239, 238

[56] References Cited
UNITED STATES PATENTS
3,092,163   6/1963   Bunker, Jr. et al. ................ 152/221
3,431,961   3/1969   Pfoertner ............................ 152/222
1,630,569   8/1928   Richie ................................. 152/221

Primary Examiner—James B. Marbert
Attorney—Brian J. Wood

[57]       ABSTRACT

An elastomeric traction device for a tire of an automotive vehicle, used in lieu of common metal tire chains or snow tires. Generally X-shaped elastomeric links joined together and applied generally as common chains are applied. Embodiments suitable for single and dual wheels. The device is characterized by good traction, relative silence, and long life.

2 Claims, 13 Drawing Figures

PATENTED NOV 6 1973
3,770,039
SHEET 1 OF 4
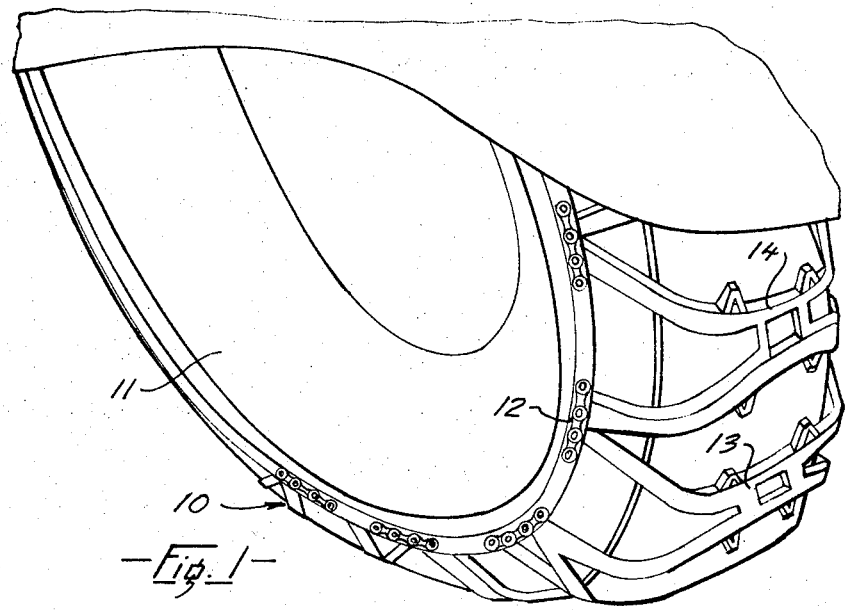
Fig. 1
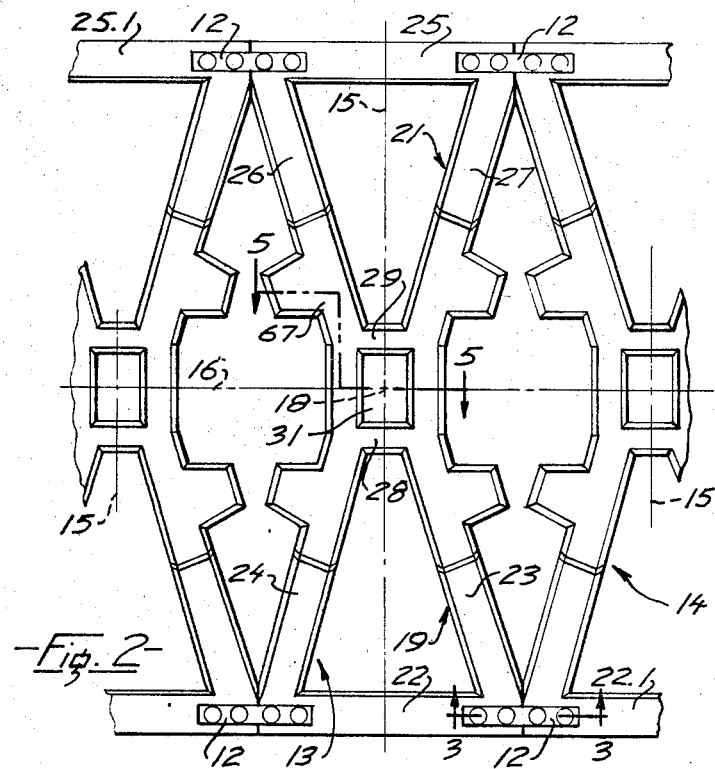
Fig. 2
Rolf Pfoertner,
Inventor
by 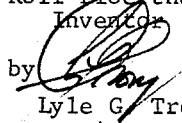
Lyle G. Trorey,
Agent

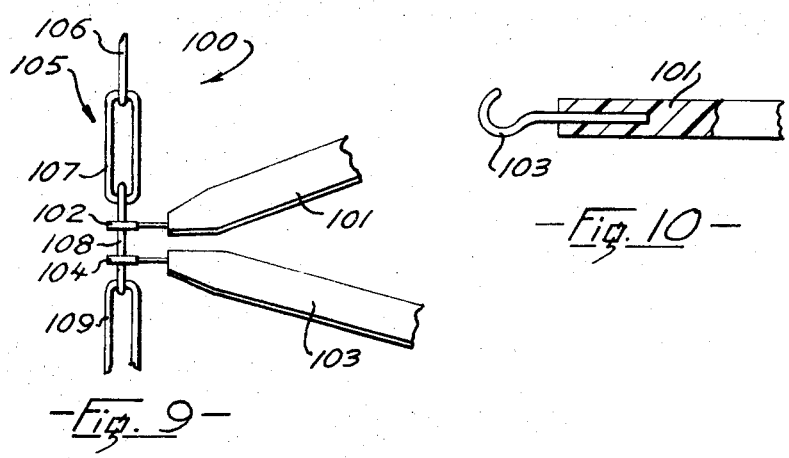
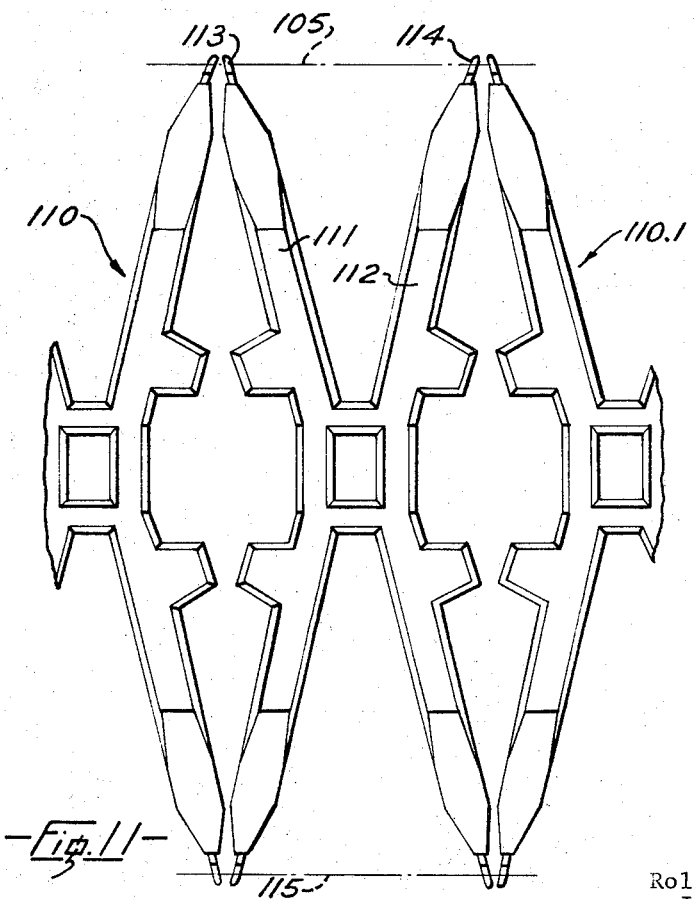

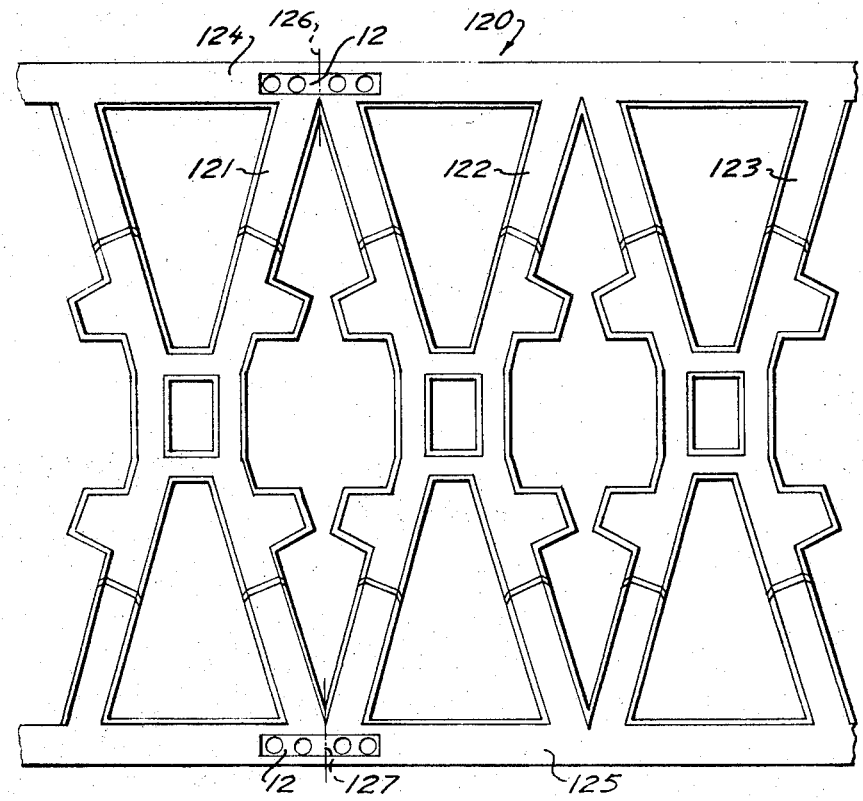
-Fig. 12-
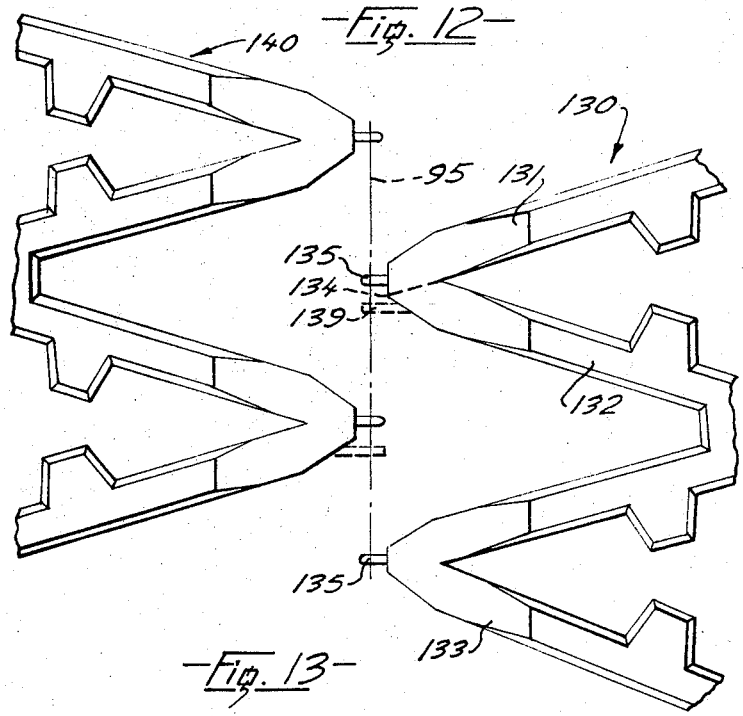
-Fig. 13-

ELASTOMERIC TRACTION DEVICE

BACKGROUND OF THE INVENTION

1. Field of the Invention

The invention relates to a traction device to be applied over and circumferentially surrounding a tire of an automotive vehicle, the device having elastomeric traction link elements assembled to form the traction device.

2. Prior Art

Metal tire chains have been used for many years to improve traction, and are known to be effective for that purpose. However, metal tire chains wear out relatively quickly, tend to damage road surfaces, are noisy, can be dangerous when they break, provide a rough ride, and have other well known disadvantages. Many devices of merit have been invented which have been successful in reducing at least some of the disadvantages above, whilst providing adequate traction.

U.S. Pat. No. 3,431,961 issued to the present inventor Mar. 11 1969 in an Elastomeric Traction Chain Element.

This patent teaches an elastomeric traction link element adapted to be assembled to provide a traction device. The invention is particularly characterized by a continuous cable extending, in a generally hour-glass configuration, through members of each link, and releasable securing means so that a required number of links may be joined together in end to end relation to provide the traction device.

The present invention distinguishes over the patent above particularly in that the hour-glass cable is not used, and that different means are provided for joining the individual links.

OUTLINE OF THE INVENTION

The present invention provides a traction device including a plurality of generally X-shaped elastomeric links. Each link has integral intersecting cross bars defining the X-shape, with a first flexible tension linkage extending across inner open ends of each link and a second flexible tension linkage extending across open outer ends of each link. Opposite ends of each cross bar are each provided with a fastener, with inner and outer ends of each cross bar respectively secured to the first and second flexible linkages, thus securing adjacent links to one another. An assembly of as many links as is required according to the size of the tire is thus formed, and means are provided to join opposite ends of each flexible tension linkage to one another.

In one embodiment of the invention for use with wheels having a single tire, the flexible tension linkages are made up of base bars extending across open ends of the cross bar X configuration and integral with the cross bars.

In a further embodiment, at least one flexible tension linkage is a cable, or can be a chain, with adjacent outer ends of adjacent links secured to one another and to the chain or cable, as the case might be, by fasteners. Multiple link strip construction is also taught.

A detail description following related to drawings gives exemplification of embodiments of the invention which, however, can be expressed in structure other than that particularly described.

DESCRIPTION OF THE DRAWINGS

FIG. 1 is a perspective of an elastomeric traction device according to the invention, shown mounted on a rear wheel of an automotive vehicle, FIG. 2 is a fragmented detail plan showing adjoining links of the device, FIG. 9 is a fragmented detail plan of an alternative dual wheel embodiment of the invention, illustrating alternative flexible tension linkage namely a chain, FIG. 10 is a detail elevation of a cross arm, showing means of attachment of the cross arm to the chain, FIG. 11 is a plan illustrating an alternative elastomeric link, FIGS. 12 and 13 illustrate multiple link strip alternatives.

DETAILED DISCLOSURE

FIGS. 1 and 2

Figure 3:
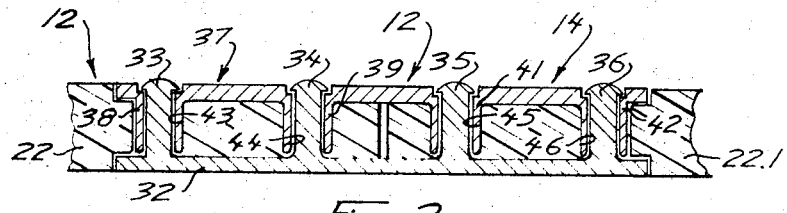
FIG. 3 is an enlarged section on 3—3 FIG. 2.

In FIG. 1, an elastomeric traction device according to the invention is designated generally 10 being shown mounted on a rear wheel 11 of an automotive vehicle.

The device, which is often called a chain, is composed of a plurality of generally X-shaped links such as 13 and 14 joined together as indicated at 12. The links of elastomeric material later particularized.

Referring to FIG. 2 which shows adjoining links 13 and 14 joined at 12, each link has a transverse axis 15 and a central longitudinal axis 16, the axes intersecting at 18.

Referring to the link 13 this has integral generally triangular elements 19 and 21. The triangular element in 19 has an inner open end closed by an integral outer base 22 and opposite sides 23 and 24 converging to an apex adjacent the intersection 18 of the axes. A base of a corresponding triangular element 21 similarly has an outer open end closed by an integral inner base 25 and opposite sides 26 and 27 convering to an apex adjacent the intersection.

It is seen that the sides 24, 26, and the sides 23, 27 are integral being centrally spaced by short parallel apex bars 28 and 29 defining a central portion 31 later described.

In an assembly of a number of links as FIG. 2, the joined bases such as 25, 25.1 (see also FIG. 1) form a first flexible tension linkage extending across the inner open ends of adjacent links; and a second flexible tension linkage is formed by the bars 22, 22.1 etc when joined, the second tension linkage extending across the outer open ends of each link.

Means to secure adjacent links to one another, FIG. 3 and reference to FIG. 2

FIG. 3 is a large scale section showing rivet means generally 12 joining adjacent links to one another.

The rivet means 12 is of metal having a base element 32 with equally spaced studs forming rivets 33 through 36. A fastener piece 37 has sockets 38, 39 and 41, 42 aligned and positioned to receive the rivets.

The base 22 of the traingular element has bores as seen at 43 and 44, and a base 22.1 of the adjacent link 14 has bores as seen at 45 and 46 to received the sockets.

When the fastener piece 37 and base 22 are assembled as shown riveting is effected securing the joint.

Figure 4:
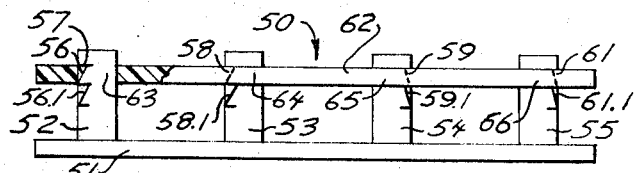
FIG. 4 is a side elevation of a snap on means of adjoining adjacent links.

Alternative means to secure adjacent links, FIG. 4

A snap on means, generally 50, to secure adjacent studs of the links to one another has a base 51 with spaced aligned pins 52 through 55 passing through corresponding holes of the bases 22 and 22.1 FIG. 2. The pin 52 as a notch 56 having an outer wall 57, the notch extending at least part way circumferentially of the pin and being disposed at an outer edge as shown. The pin 53 has notches similarly disposed, the pins 54 and 55 also having similar notches 59 and 61 facing oppositely outwards as shown.

A fastener piece 62 has aligned holes 63 through 66 to receive the pins, the outer wall 57 of the notch is spaced from an upper end of the pin and is positioned so that when the fastener piece is in place as shown, an inner side of the base is spaced from an inner side of the fastener piece by a distance somewhat less than the thickness of the base of the link.

The base and the pins can be metal, with the fastener piece a suitable plastic as known in the trade. At least one notch is provided on one of the pins 52 or 53, and on one of the pins 54 or 55.

The elastomer of the links is resilient, a second notch can be provided on the pins as shown at 56.1, 58.1, 59.1, and 61.1, this gives tightening possibilities.

Alternatively the fastener piece 62 can be made of metal which can be countersunk so as to provide an interference lock with the notches, as known in the art.

A hook and cable securing means is later described and illustrated with reference to FIGS. 7 and 8.

Particular means used to secure the adjacent links to one another is not of importance to the invention, any of several well known means can be used. The riveting embodiment illustrated in FIG. 3 is satisfactory and, with a known riveting tool links can be rapidly assembled. The FIG. 4 alternative also gives satisfactory results in practice, and a chain assembled in this manner can be disassembled with little trouble.

Figure 5:
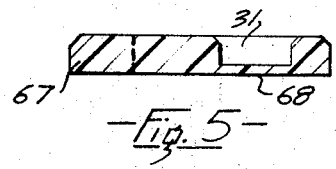
FIG. 5 is a section on 5—5 FIG. 2.

FIG. 5, and reference to FIG. 2

A section on 5—5 FIG. 2 is shown in FIG. 5. Referring to FIG. 2 it is seen that the side 26 of the triangular element 21 has an outwardly disposed lug circumferentially extending 67, as seen also in FIG. 5. Under some circumstances this lug increases traction and can be provided on each of the sides as seen in FIG. 2. Provision of the lugs also results in noise suppression during operation on hard surfaced roads.

The central portion 31 as it comes out of a mold ordinarily has a thin web 68. Effectively however the central portion 31 is open, the web not having a thickness which is material in the circumferences.

INSTALLATION AND OPERATION

As many individual link elements as required, say about twenty, are assembled as seen in FIGS. 1 and 2, with each link being secured to the adjoining link by means such as illustrated in FIG. 3, or FIG. 4. The chain is best mounted with the vehicle on a hoist and the tires partially deflated. In this way, adjoining ends of the traction link assembly can readily be fastened. Now, when the tires are inflated, the assembly is strained to a snug secure fit, beocming almost a part of the tire. The links are resilient so that fit of adequate tightness can ordinarily be attained by adding or removing one link. The links themselves come in different sizes, for instance for truck and for passenger car tires, and are of such length (measured on the axis 16 FIG. 2) in relation to outer circumferential length of a tire that a relatively large number of links, say twenty, is used — actual number depending on tire size. Links of special length can be provided for use in unusual circumstances.

The foregoing has reference to what is virtually a semi-permanent installation. Where it is necessary to install the chain on the road, while this is more difficult and while nice fit is not readily attained, the procedure is substantially as with conventional non-skid chains. Common tire chain tightening links can be used.

Figure 6:
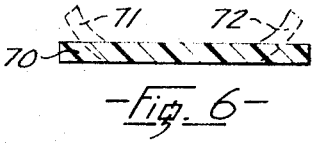
FIG. 6 is a diagram illustrative of a pre-shaped link.

Pre-shaped link, FIG. 6

In making individual links, the molds and the pouring are according to known practice. The molds are flat, thus if allowed to cure a link would be flat as indicated at 70, FIG. 6. Before curing is complete the link is removed from the mold and placed in a simple jig causing it to take a shape as indicated in broken outline at 71 and 72, so that the link is pre-shaped according to the tire section.

It is readily seen that a chain being assembled of such pre-shaped links can be mounted and fitted more readily than a chain of flat links.

Hereinafter and in the claims, pre-shaped link means a link which has been shaped as shown in broken outline in FIG. 6.

DUAL WHEEL MODIFICATIONS

FIG. 7

Traction chains as described above are not sutiable for mounting on dual wheels because, ordinarily, there is not sufficient space in which to effect joining and tightening of the ends of the chains of each wheel of the dual.

Figure 7:
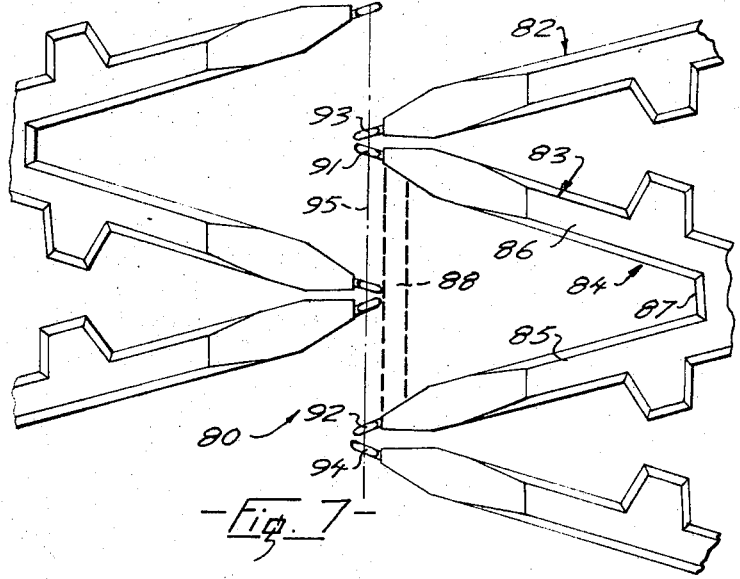
FIG. 7 is a fragmented detail plan of a dual wheel embodiment of the invention.

A modification shown in FIG. 7 is particularly adapted for dual wheel installation.

The dual embodiment, generally 80, has an elastomeric link assembly 81 for one wheel of the dual, and a similar assembly 82 for the remaining wheel of the dual. The chain assembly 82 has a link 83 having a generally triangular element 84 which is defined by bars 85 and 86 converging to an apex bar 87 and extending in X-configuration. A base 88 is shown in broken outline.

In the FIG. 7 embodiment, the base 88 is not used, and inner ends of the sides 85 and 86 terminate in eyelets 91 and 92, corresponding eyelets on adjacent links are designated 93 and 94.

Remaining parts of the link 83 not shown are as described with reference to FIG. 2, and it is seen that the generally X-shaped traction element 84 is as the corresponding triangular element described with reference to FIG. 2 except for the absence of the base, shown in FIG. 7 in broken outline at 88, and in that the eyelets 91 and 93, and 92, 94 serve — as later is explained — as means to join the adjacent links to one another.

The chain assembly 81 is as described with respect to the chain assembly 82. Securing adjacent links to one another, FIGS. 7 and 8

The chain assemblies 81 and 82 are disposed relatively to one another as shown in FIG. 7, with the chain 81 on one tire of the dual, and the chain 82 on the remaining tire of the dual wheel. As shown in FIG. 7, the eyelets 91, 93, are midway between the corresponding eyelets of the chain assembly 81. This position is not critical, and the eyelet pair 91, 93 can be closely adjacent either eyelet pair of the chain assembly 81.

Figure 8:
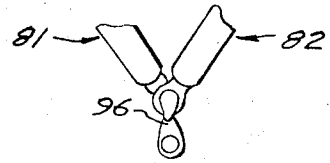
FIG. 8 is a fragmented detail showing fasteners secured to a flexible tension linkage, viz. a cable.

Referring to FIG. 8, a cable 95 has a plurality of spaced hooks 96, each hook engaging a pair of adjacent eyelets, such as 91 and 93, of adjacent links of one chain assembly so as to provide means of securing adjacent links to one another. From FIG. 7 it is now seen that a part of the cable extending between the hooks engaging the eyelets 91, 92 is equivalent to the omitted broken outline base 88. Indeed, a base can be provided in the link 5, as indicated with respect to the link 83 only, in broken outline designated 88.

The cable 95 is a flexible tension linkage, functioning as the flexible tension linkage previously described.

Dual Installation

In the following, adjacent side edges of the chains 81 and 82 FIG. 7 are referred to as inner edges, the remaining side edge of each chain is called an outer side edge.

The individual chains 81, 82 are assembled by joining their outer edges together by, for instance, the rivet means of FIG. 3 until chains of sufficient length are obtained.

A dual chain as FIG. 7 can now be assembled by passing the hooks successively through the relevant eyelet pairs obtaining a configuration such as FIG. 7 — where the cable is indicated in broken outline by a centerline 95.

On a hoist the composite chain 81, 82 is now secured to the tires with the outer side edges adjusted as before described, and with the inner side edges being tightened with the use of a cable tightener and fastener secured to each end of the cable.

The cable tightener is well known toggle activated device and is not described or illustrated With proper tension in the cable and in the outer side edges, the two chains 81 and 82 do not creep materially relative to one another because of large frictional force.

However to allow for, for instance, accidental under inflation of one of the duals, some of the hooks 96 can be crimped to the cable so as to prevent creep.

A chain assembly such as 82, FIG. 7 can be used on a single tired wheel as FIG. 1. The links can be as illustrated with the cable and hooks securing adjacent links at one side, and base 88 can be provided for each link.

ALTERNATIVE DUAL WHEEL EMBODIMENT

FIGS. 9 and 10

An alternative dual wheel embodiment is designated generally 100. Adjacent elastomeric links of this embodiment differ from those described with reference to FIG. 7 only in fastening means. In FIG. 9 adjacent arms of adjacent elastomeric links are designated 101 and 103, the arm 101 has a fastener 102, and the arm 103 a similar fastener 104. As seen in FIG. 10, the fastener 103 is a hook, the fastener 104 also being a hook.

In FIG. 9 flexible tension linkage, namely a chain, is designated generally 105, links 106 through 109 being shown. The hooks 102 and 104 are secured in the link 108 as shown. It is seen that the FIG. 9 embodiment differs from the FIG. 7 embodiment in that the flexible tension link-ages are respectively a cable and a chain, and in means of securing adjacent ends to the flexible linkage. The two constructions are equivalent.

ALTERNATIVE ELASTOMERIC LINK, SUITABLE BOTH FOR DUALS AND SINGLE TIRED WHEELS

FIG. 11, and reference to FIGS. 7 and 9

In FIG. 11 adjacent elastomeric links are designated 110 and 110.0. These links have adjacent elastomeric cross arms 111 and 112 defining a generally X-shaped configuration, the cross arms being secured to the chain 105 as described with reference to FIG. 9.

Ends of the arms 111 and 112 have hook fasteners 113 and 114 as described with reference to the hook fastener 102 FIG. 10.

A second chain 115 has links which are engaged by the hooks as has been described with reference to FIG. 9.

It is seen that each of the elastomeric links of FIG. 11 is generally X-shaped as is characteristic of all the embodiments, and that the flexible tension linkage extending across each open end of the X is a chain.

It is clear that links such as illustrated in FIG. 11 can be used with three flexible tension linkage chains for a dual embodiment. It is also clear that eyelet fasteners as 91 through 94 FIG. 7 and a cable can be used in substitution for one, or for both, — which arrangement is not illustrated.

ELASTOMERIC LINK MATERIAL

A polyurethane elastomer marketed by DuPont and known as Adiprene ( a registered trademark of duPont) is readily processed by compression moulding, moulded parts having a high tensile and tear strength, and excellent abrasion resistance. Moulding procedure and properties of polyurethane under various conditions are given in standard works reference to two of which is made below.

Other polyurethanes suitable for moulding are readily available, see eg. Modern Plastics Encyclopedia, McGraw Hill; or Polyurethane Chemistry, Saunders and Fisch, Wiley, and can be used.

The polyurethane can be mixed with fibreglass or polypropylene threads for somewhat enhanced tensile strength and finally divided carbon ( one to two parts per hundred by weight) can also be added. The carbon gives a black colour which some users prefer, but more important it serves to proect the material from sunlight and fumes which can have adverse effect.

MULTIPLE LINK ALTERNATIVES

FIG. 12, with reference to FIG. 2

In FIG. 12 a number of links generally as the links 13, 14 FIG. 2 are shown moulded in a continuous strip 120, with links 121, 122, 123 being shown. Upper and lower base members 124, 125 are common to all of the links of the strip, forming as before a flexible tension linkage. Joining means, eg. 12 FIG. 2, are not required between the links the bases 124 and 125 being integral with the links.

The base members are cut (at each end) along broken outline cut lines 126, 127 so as to provide the, say, twenty links required. Each end of each continuous base 124, 125 is provided with a joining means such as 12.

The FIG. 7 and FIG. 12 constructions are equivalent.

FIG. 13 and reference to FIG. 7

FIG. 13 shows a continuous strip 130 of a number of links as the link 83 FIG. 7 — links 131, 132, 133 being shown fragmented. The strip is cut at a broken outline cut line 134, and eyelets 135 are provided as shown for attachment to hooks of the cable 95. Additional eyelets, one being shown in broken outline at 139 are to be added to the cut strip, to join opposite ends — one to each side.

A similar continuous strip 140 is also seen in FIG. 13, being a strip for a dual tire.

Embodiment of FIG. 13 is equivalent to that of FIG. 7.

FIGS. 9, 10, 11, equivalent strip constructions

A further equivalent strip possibility not illustrated, uses hooks, as the hook 103 FIG. 10, and chain flexible linkage as FIG. 9, the strip being, except for substitution of hooks for eyelets, as FIG. 13 — equivalent to the embodiments of FIGS. 13 and 7.

I claim:

1. An elastomeric traction device for an automobile tire including:
   a. a plurality of generally x-shaped elastomeric traction links, each link including,
      i. intersecting integral cross-bars defining the x-shaped link
      ii. parallel base bars connecting adjacent ends of the cross-bars
      iii. outwardly disposed circumferentially extending lugs projecting from sides of the cross-bars
      iv. the base bars of adjacent links being integral of each other so as to form a continuous strip of x-shaped links so that the traction device can be extended circumferentially around the tire.
   b. means for connecting adjacent ends of each of the continuous strips of the bases to maintain the traction device in place on the tire.

2. A traction device as claimed in claim 1 in which the traction device is formed of a mixture of polyurethane and polypropylene threads.

* * * * *